United States Patent [19]

Winter

[11] Patent Number: 4,986,716

[45] Date of Patent: Jan. 22, 1991

[54] REFUSE COLLECTION VEHICLE

[75] Inventor: Erich Winter, Stuttgart, Fed. Rep. of Germany

[73] Assignee: Kellner AG, Steinhausen, Switzerland

[21] Appl. No.: 422,142

[22] Filed: Oct. 16, 1989

[30] Foreign Application Priority Data

Oct. 20, 1988 [DE] Fed. Rep. of Germany ....... 3835748

[51] Int. Cl.[5] ........................................ B60P 1/48

[52] U.S. Cl. .................................... 414/409; 414/408; 414/498; 414/495; 414/525.2; 414/525.6; 414/528; 414/526; 414/501; 100/218; 298/23 MD

[58] Field of Search ................ 100/218; 414/404, 406, 414/407, 408, 409, 421, 422, 495, 498, 501, 474, 486, 555, 546, 529.6, 528, 526; 298/23 MD

[56] References Cited

U.S. PATENT DOCUMENTS

| | | | |
|---|---|---|---|
| 3,202,305 | 8/1965 | Dempster et al. | 414/408 |
| 3,425,576 | 2/1969 | Martin | 414/498 |
| 3,881,613 | 5/1975 | Torimoto et al. | 414/498 X |
| 4,597,710 | 7/1986 | Kovats | 414/409 |
| 4,715,767 | 12/1987 | Edelhoff et al. | 414/408 |

FOREIGN PATENT DOCUMENTS

| | | | |
|---|---|---|---|
| 314429 | 8/1971 | Australia . | |
| 384799 | 6/1987 | Australia . | |
| 1225546 | 9/1966 | Fed. Rep. of Germany . | |
| 1531763 | 1/1970 | Fed. Rep. of Germany | 414/406 |
| 2816959 | 10/1979 | Fed. Rep. of Germany . | |
| 3420058 | 12/1985 | Fed. Rep. of Germany . | |
| 8401018 | 10/1985 | Netherlands | 414/409 |
| 1373638 | 2/1988 | U.S.S.R. | 414/408 |

*Primary Examiner*—Frank E. Werner

*Attorney, Agent, or Firm*—Dressler, Goldsmith, Shore, Sutker & Milnamow, Ltd.

[57] ABSTRACT

A refuse collection vehicle (10) supports an interchangeable refuse collection container (14), the rear wall (38) of which is pivotable between an unloading position and a closed position by means of a swivel device (41). On the chassis (12), a support plate (16) is pivotable about a horizontal transverse shaft (18) between a horizontal interchange position for the refuse collection container (14) and a vertical loading or pressing position, the pressing device (26) and the lifting and tipping device (22) being integral with the support plate (16). The support plate (16) is also provided with a locking device (114), which, dependent upon the swivelling of the pressing device (26) from its rest position into the pressing position, can be locked with two locking shafts (90, 91) on the rear wall (38) of the refuse collection container (14). In the interchange position, the upper side, formed by the pressing device (26), of the support plate (16) lies lower than the support surface (120) of the chassis (12), so that the chassis can be driven away from under the refuse collection container (14) in the direction of travel (y), after the refuse collection container (14) has been set down on the ground on its own support feet. The vehicle has a small construction length and low weight, so that rapid interchange of refuse collection container is possible.

11 Claims, 5 Drawing Sheets

REFUSE COLLECTION VEHICLE

The invention relates to a refuse collection vehicle.

Chassis of the above-mentioned type are known from the brochure "Fortschritt mit FAUN UMWELTTECHNIK (Progress with FAUN UMWELTTECHNIK)" of FAUN Umwelttechnik GmbH, D-2860 Osterholz-Scharmbeck. In this system, commercial chassis and known refuse collection bodies are used with the necessary lifting and tipping devices, the mobility for the individual disposal phases, namely collection, transportation and emptying, being afforded by means of interchangeable bodies. At the same time, conventional rear loading for existing refuse bins is provided. The refuse collection containers are to be changed at the rear. To this end, the pressing device, which remains on the chassis, is first raised. The full refuse collection container is then set down to the rear. The containers are exchanged on a setting down surface corresponding to them and transported on by road by means of large transport units or conveyed by rail to a refuse treatment plant. The discharging plate remains in the refuse collection container so that each container can be completely emptied. The combined lifting and tipping device and pressing device is at its upper end pivotably mounted by two supports, which project from the longitudinal sides of the chassis, and can be pivoted from a vertical position through 90° into a horizontal position, in which it adopts a position at a distance above the refuse collection container, which is situated on the chassis. Accordingly, the refuse collection container can subsequently be removed backwards from the chassis and set down on supports of the container. After this, the chassis again receives an empty refuse collection container from the rear and the combined lifting and tipping device and pressing device is again swivelled into its vertical position against the rear side of the empty refuse collection container situated on the chassis, so it is in its working position and the vehicle is ready for use for refuse collection again.

In Austrian Patent No. 384,799, a tipping device for emptying a refuse bin, in particular for refuse vehicles, is described, which is provided with a frame, a guide, on the frame, for a carriage, which is adjustable according to height by means of a lift gear and which supports receiving arms for the refuse bin, and with at least one swivel gear for the receiving arms, which comprises a swivel lever, which is connected in a rotationally fixed manner to the receiving arms. The swivel lever engages in a slot, which is fixed relative to the frame and which has a section, which is parallel to the guide of the carriage, and a section, which is connected to the first section towards the top, runs transversely to the guide and lies at a distance below the upper end of the guide. To solve the problem of extensively eliminating the risk of dirtying, ensuring self-cleaning of the guide for the carriage and achieving a small construction depth, it is envisaged that the guide for the carriage forms a slide guide for two lateral carriage slides, in which a tipping shaft, which supports the receiving arms for the refuse bin, is rotatably mounted, the swivel lever of the swivel gear engaging with the tipping shaft. The guide comprises two rails, which are open towards one another and U-shaped in cross-section, between the legs of which the lift gear, which is parallel to the rails and engages with the carriage slides, runs. The slot of the swivel gear is arranged on the frame outside the rails of the guide in the direction of the tipping shaft. The tipping shaft travels through the web of at least the rail neighbouring the slot in a long hole. The swivel lever engages with a stub of the tipping shaft, which stub travels through the rail, and runs in the space between the slot and the neighbouring rail.

From German Auslegeschrift No. 12 25 546, a refuse vehicle is known, with a body, which can be removed from and set down on the chassis frame from above by means of automatic centring, a loading device at its rear lower end being executed as a setting down surface, with which it supports itself on the roadway when bodies are interchanged, in order to ensure the stability of the refuse vehicle when the fully loaded body is removed.

In Austrian Patent No. 314,429, a large capacity refuse transport container is described, with an end door, which is executed as a closing gate, which is pivotable about hinges situated at the top. In the closing gate, a filling opening is provided, which can be sealed by means of a sealing cap, which can be connected optionally to the closing gate or to a pressure piston of a packing device and is fitted into the filling opening without overlap.

German Offenlegungsschrift No. 34 20 058 describes a refuse collection vehicle with containers, which are designed as interchangeable containers and which have a tipping unit, which is rigidly connected to the vehicle. The charging opening and a lifting and tipping device for the refuse bin is provided in the front area of the vehicle. The container contains a conveying and pressing device for the refuse, which is emptied into the charging opening. The charging opening is situated partly above the driver's cab and partly between the latter and a tipping unit assigned to the container in the area behind and above the driver's cab. A ground guide rail, which is arranged on a lifting arm of the lifting and tipping device, which is pivotable about a transverse shaft, is pivotable between its receiving area below and in front of the driver's cab and its tipping area above and behind the driver's cab and is provided with run-out and/or swing-out devices for connection to waiting refuse bins.

According to German Offenlegungsschrift No. 28 16 959, it is envisaged that it be possible, after uncoupling from the loading gear, to remove a refuse container from the chassis or set one down upon it, the refuse container loading gear unit being easy to mount and handle on existing mass-produced vehicles. To this end, the refuse collection vehicle is executed with an interchangeable refuse container and loading gear arranged at the rear of this in such a manner that the loading gear can on the one hand be mounted on the chassis and on the other be detachably arranged on the refuse container. In this connection, it can be unlocked from the locked position it is in with the refuse container during operation and it can be pivoted about a shaft, which in its position of use runs approximately vertically, to the right and/or the left side of the vehicle into a position, in which the refuse container can be removed from or set down upon the refuse collection vehicle. After the loading gear has been swivelled aside, the refuse container can be removed from the vehicle towards the rear or set down upon it. The loading gear can be mounted on a motor-driven, hydraulic support structure arranged on the chassis.

The object of the invention is to improve the chassis of the known type referred to in the introduction in such a manner that the refuse collection containers can be interchanged rapidly, that the dead load of the chassis is reduced by means of a simple and light design of the pressing device with integral lifting and tipping device and that, nevertheless, a safe carrying off into the chassis and into the refuse collection container of the torques arising during the pressing process is ensured.

The invention makes possible within a very short time the collection of refuse and scrap materials in commercial refuse collection containers as well as their interchange by means of the lifting and lowering device assigned to the support frame of the chassis. The one-piece rear wall of the refuse collection container serves not only to open and close the refuse collection container, but also to receive the pressing device. As the support plate in its interchange position lies below the support surface of the support frame, the lifting and lowering device can, after the support feet of the refuse collection container have been moved into their position of use, lower the support frame so that the chassis below the supported refuse collection container can be driven off in the forward direction of travel and can immediately be driven under a waiting, emptied refuse collection container in order to receive the same. The front and rear axles of the chassis are preferably fully air-suspended, the support frame of the chassis being suitable for receiving 20 foot containers in accordance with the ISO standard. At the frame end of the chassis, the support plate with the pressing device and integral lifting and tipping device is pivotable through approximately 90° between the approximately horizontal rest or interchange position and the approximately vertical loading and pressing position. The pressing device serves as control element for the locking of the support plate and preferably comprises at least one worm conveyor, but can also be executed as a plunger piston guided in a telescope-like manner. The pivotable rear wall of the refuse collection container is in its closed position curved towards the interior of the container, in order to be able to better absorb the torques arising during the pressing of the refuse in the container. Additionally, this curving of the rear wall reduces the overhang at the rear. Lastly, this shaping of the rear wall ensures that the external dimensions of the standardized refuse collection container remain exactly the same. This is important because these containers have to be suitable for storage and transport on road, rail and water. The refuse collection vehicle can of course be a motor vehicle. Furthermore, the support frame of the chassis for the refuse collection container can be formed from a conventional supplementary frame of the chassis frame, the front axle(s) and the rear axle(s) of the chassis being air-suspended. In the absence of air suspension, or even in addition to it, the support frame can, however, comprise a special pressure medium operated lifting frame, which makes possible, independently of the suspension of the chassis, rapid lifting and lowering of the refuse collection container and, if necessary, in conjunction with an air suspension of the chassis, an even greater height of lift of the lifting frame.

The invention is illustrated below with reference to the schematic drawing of an exemplary embodiment, in which.

Figure 1:
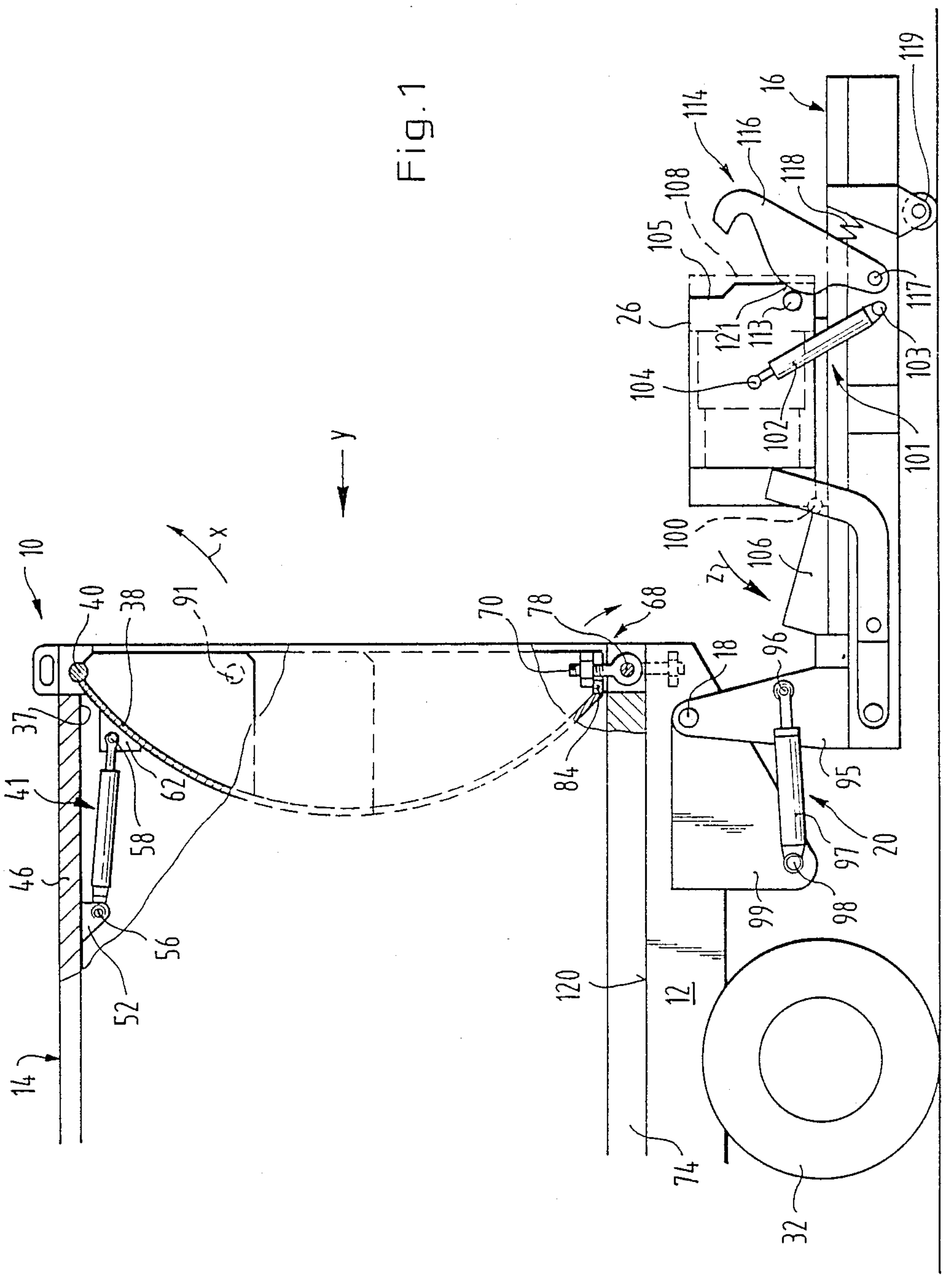
FIG. 1 shows a chassis with, arranged pivotably on it, a support plate with integral pressing device and lifting and tipping device in a horizontal interchange position, and with, arranged on the chassis, a refuse collection container in a partially cut-away side view.
Figure 2:
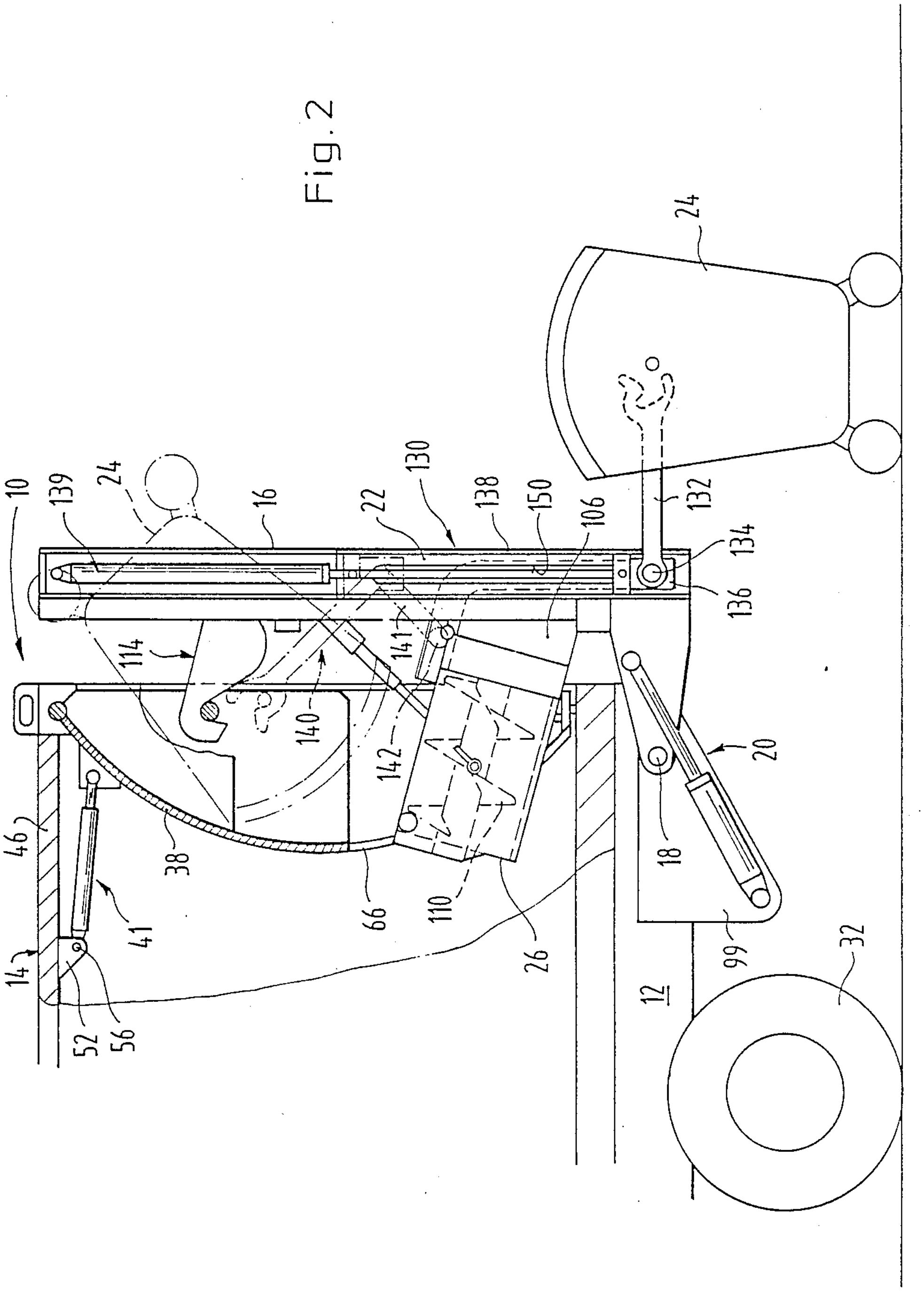
FIG. 2 shows, in a partially cut-away representation, a vertical longitudinal section approximately according to the plane II—II in FIG. 4 with the support plate in the vertical loading and pressing position.

In the figures, a refuse collection vehicle 10 is shown, the chassis 12 of which carries an interchangeable refuse collection container 14. At the rear end of the chassis 12, a support plate 16 is pivotably mounted by means of an operating device 20 about a horizontal shaft 18 between a horizontal interchange or rest position as shown in FIG. 1 and a vertical loading or pressing position as shown in FIG. 2. On the support plate 16, a lifting and tipping device 22 for refuse bins 24 and a pressing device 26 for conveying and compacting the refuse material inside the refuse collection container 14 are integral.

The refuse collection vehicle 10 can be executed as a motor vehicle or a trailer, the chassis 12 being supported via a lifting and lowering device 11, which comprises compressed-air bellows 28 connected to a compressed-air system, on each axle 30 and its wheels 32.

On the chassis 12, a support frame 34 is arranged, on which the refuse collection container 14 is interchangeably fixed in conventional manner. In a construction known per se, and thus not represented, the chassis 12 can have a supplementary lifting frame for the refuse collection container 14, arranged in the centre of each axle 30. With such a lifting frame, a greater height of lift can be achieved than with a level regulation by means of the air suspension. It is also possible of course to support the support frame 34 by means of conventional spiral springs or plate springs and to use additionally a pneumatically liftable lifting frame of the described type.

The refuse collection container 14 is provided with run-in and run-out support feet 36 (FIG. 5), which make it possible to set down a full refuse collection container 14 in a conventional manner at a collection point. As the support frame 34 of the chassis 12 can, as a result of the air suspension, be lowered to a lower level in relation to the set down refuse collection container 14, the vehicle can be driven off under the refuse collection container 14 in the direction of travel y and can immediately be driven under another waiting, empty refuse collection container and be loaded with it. The refuse collection vehicle is thus immediately ready for use again.

The refuse collection container 14 can comprise a standardized container as is conventional internationally. In order that such a container can be used as a refuse collection container, it is expedient, as is known per se and thus not represented, to provide it with an emptying device, which comprises either an emptying plate, which is mounted longitudinally displaceably on the container floor and is in general hydraulically driven, or a conveyor floor, which is constituted by an endless slat conveyor.

Figure 4:
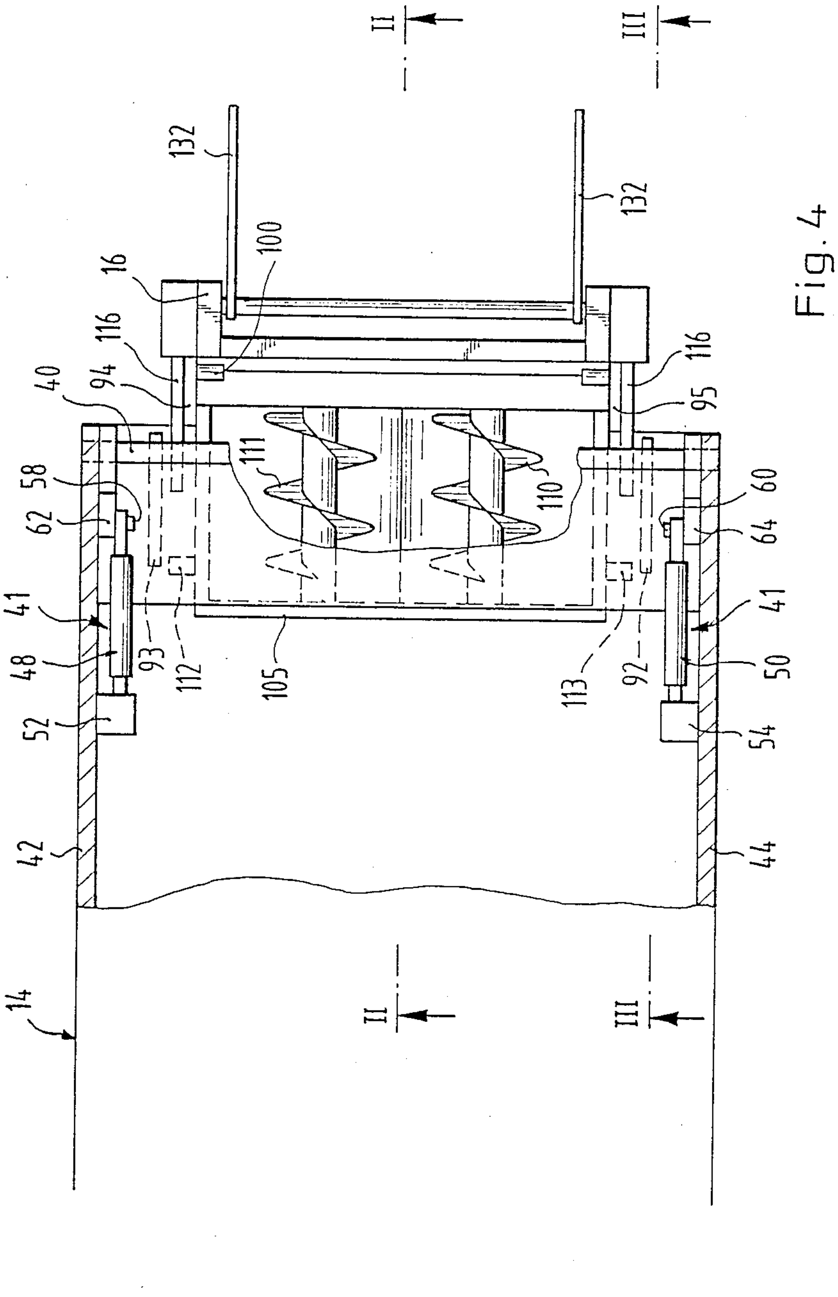
FIG. 4 shows a horizontal cross-section approximately according to the plane IV—IV in FIG. 3, partially cut-away.

According to the invention, the rear container opening 37 of the refuse collection container 14 is provided with a one-piece rear wall 38, which is pivotable, by means of a pressure medium operated swivel device 41 about a horizontal swivel shaft 40, which runs transversely to the longitudinal direction of the refuse collection container 14, between a swivelled out position (not shown) in the direction of the arrow x and the closed position shown in the drawings. According to FIG. 4, the swivel device comprises two mirror-image pressure medium operated cylinder and piston assemblies 48, 50, arranged on the inner sides of the side walls 42, 44 of the refuse collection container 14 as well as on the underside of the cover 46 of the same, each of the cylinders of which are pivotably articulated on a bracket 52 or 54 at 56 (FIGS. 1 and 2). The free end of the piston rod of the cylinder and piston assemblies 48 or 50 is articulated on a pin 58 or 60 of a sheet 62, 64, which is in each case fixed on the rear side of the rear wall 38 at a distance below the swivel shaft 40. The rear wall 38 is provided with a receiving opening 66, into which the pressing device 26 projects in the loading position of the support plate 16 and through which the refuse contents of the refuse bin 24 in the emptying position shown in dot-dash lines in FIG. 2 can be conveyed into the inside of the refuse collection container 14 by means of the pressing device 26.

The curving of the rear wall 38 into the inside of the refuse collection container 14 makes possible the maintenance of small external dimensions of the refuse collection vehicle as well as a high stability upon absorbing the torques, which arise during the compaction of the refuse material by means of the pressing device 26.

Figure 5:
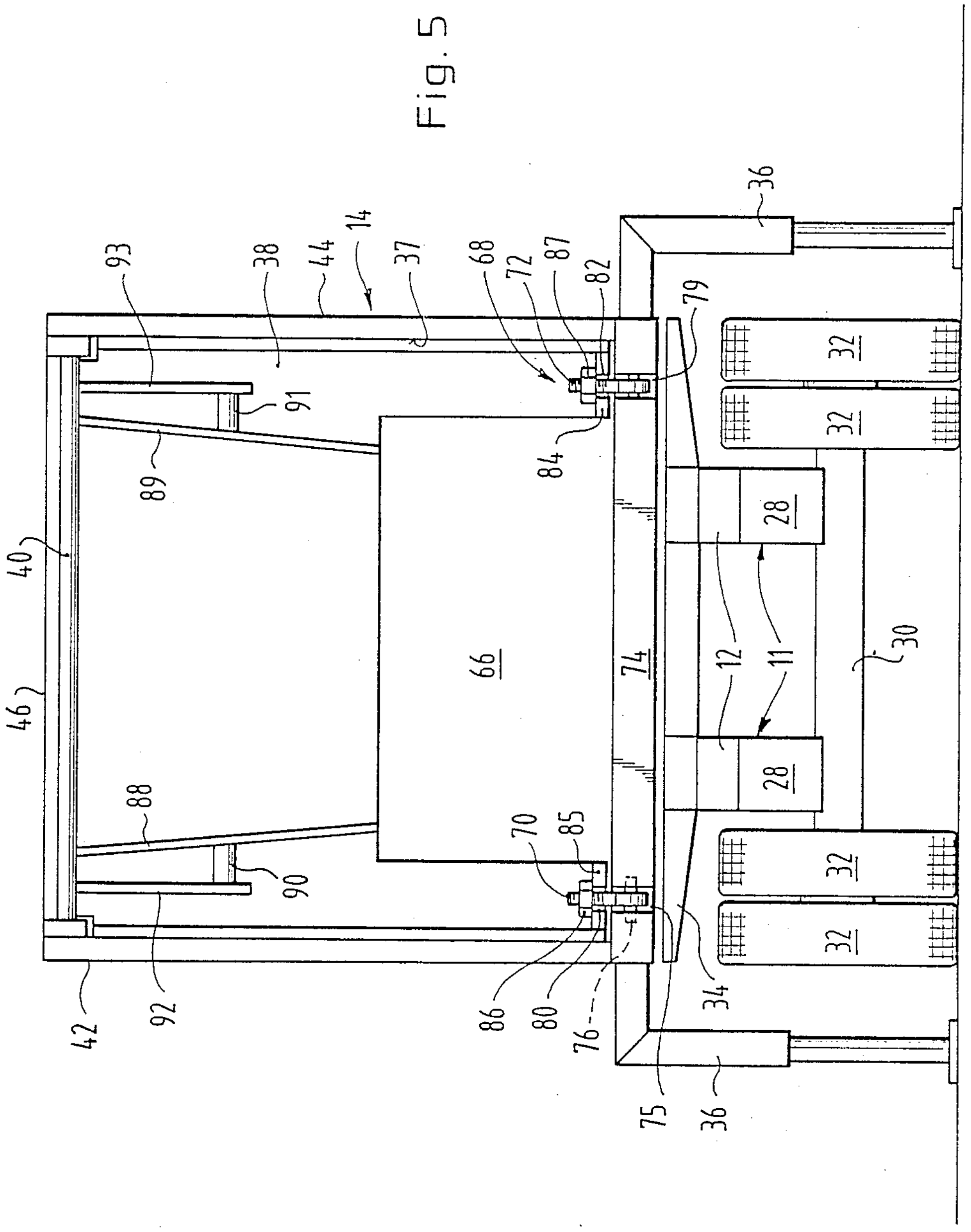
FIG. 5 shows a rear view of the refuse collection container standing on its support feet and the chassis, which has been lowered in relation to the latter.

According to FIGS. 1 and 5, the rear wall 38 can be locked in the closed position by means of a fastening device 68. This fastening device 68 comprises two swivelling screws 70, 72, which are pivotable about shafts 76, 78 between an upper fastening position for the rear wall 38 and a lower rest position. To this end, each of the shafts 76, 78 travels through a recess 75, 79, which is open to the rear end of the floor 74 of the refuse collection container 14, transversely to the longitudinal direction of the vehicle. In the fastening position, the swivelling screws 70, 72 each engage in a forked slot 80, 82 of a horizontal section 84, which is parallel to the floor 74. By means of nuts 86 or 87, the section 84 is tightened against the container floor 74 in the closed position.

Above the receiving opening 66 in the rear wall 38, tipping sheets 88, 89 are arranged on the outside of the latter, which guide the refuse material towards the receiving opening 66 of the rear wall 38. On the outside of the tipping sheets 88, 89, locking shafts 90, 91 are fastened at equal height with their inner ends and extend horizontally outwards from the tipping sheets 88, 89, their outer ends being rigidly connected to reinforcement sheets 92, 93, which are also fastened to the outside of the rear wall 38 and provide this with additional reinforcement.

The support plate 16 is provided at its end which is turned towards the swivel shaft 18 with in each case two swivel arms 94, 95, which are pivoted on the swivel shaft 18, which travels through the rear end of the chassis 12 horizontally and transversely to the longitudinal direction of the latter. At a swivel point 96 on the swivel arms 94, 95, which lies between the support plate 16 and the swivel shaft 18, the free end of the piston rod of a cylinder and piston assembly 97, which constitutes the swivel device 20, engages. At the same time the cylinder end is connected to a swivel point 98, which is arranged lower and, in the direction of the arrow y, in front of the swivel shaft 18 on a bearing sheet 99, which is fixed on both sides of the chassis 12 and extends downwards to approximately the height of the wheel axles. In the drawings, only one swivel device 20 is shown in each case. The other swivel device (not shown) is situated on the other longitudinal side of the vehicle and is connected to the other swivel arm 94 of the support plate 16.

The pressing device 26 is pivotable on the inner side of the support plate 16 about a shaft 100 in the direction of the arrow z by means of a swivel device 101, which comprises a cylinder and piston unit 102, which is pressurized with a pressure medium and is pivoted at 103 on the support plate 16 and at 104 on the housing 105 of the pressing device 26. The pressing device 26, which is shown in its rest position in FIG. 1 and the longitudinal axis of which runs parallel to the plane of the support plate 16, can be pivoted through less than 90° against a support 106 by means of the cylinder and piston unit 102. The support 106 thus forms with the main plane of the support plate 16 an acute angle, which opens in the direction of travel y in FIG. 1. Accordingly, the pressing device 26, when swivelled into its vertical loading or working position, forms an acute angle with the floor 74 of the refuse collection container 14, which opens in the direction of travel y. This makes it possible to convey the refuse material upwards at an angle and forwards into the inside of the refuse collection container 14 as well as to extensively fill the same, before the refuse material in the refuse collection container 14, when it is approximately full, becomes increasingly compacted. As can be seen, the pressing device 26 is represented as a pressure ram 108, guided in a telescope-like manner in FIG. 1 but as a worm conveyor in FIGS. 2 and 3. The use of two worm conveyors 110, 111 arranged parallel to one another is preferred according to FIG. 4, which are supported in a conventional manner in conveyor troughs and if necessary are adapted, by means of a partition extending between the worm conveyors, for the conveying of different refuse material such as, for example, glass through the one worm conveyor 110 and, for example, paper through the other worm conveyor 111.

At the outer end of the housing 105 of the pressing device 26, from both its sides, unlocking bolts 112, 113 for a locking device 114 project, which are parallel to the main plane of the support plate 16 and comprise two locking levers, of which only one locking lever 116 is shown in FIG. 1. These locking levers are pivotable on both outer sides of the support plate 16 about a swivel point on the support plate 16, one of which is indicated in FIG. 1 by 117. The unlocking bolts 112, 113 hold the locking levers 116 against the action of a pretensioned spring or a locking spring 118 in the unlocked position. The support plate 16 is, in its horizontal interchange or rest position in FIG. 1, supported on a support roller 119, which is fixed to the outside of the support plate 16. At the same time, the upper side of the housing 105 of the pressing device 26 lies lower than the support surface 120 of the chassis 12 for the refuse collection container 14, so that, as shown in FIG. 5, the vehicle, with the support frame 34 lowered by means of partial emptying of the air bellows 28, can be driven out from under the refuse collection container 14, which has been set down on its support feet 36.

Figure 3:
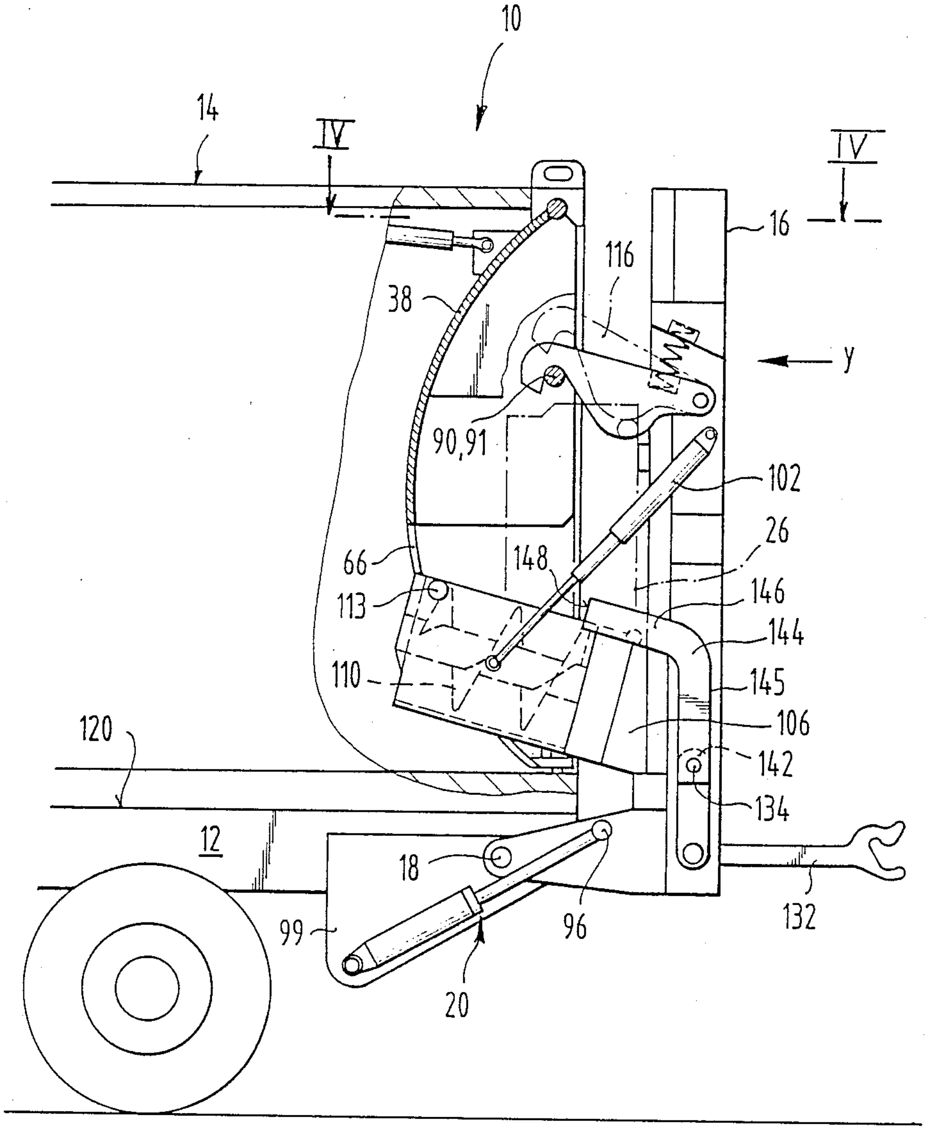
FIG. 3 shows a representation similar to FIG. 2 approximately according to the cross-section III—III in FIG. 4 with the locking device of the support plate on the pivotable rear wall of the refuse collection container.

FIG. 3 shows more clearly the locking of the support plate 16 in the vertical loading or pressing position. The pressing device 26 maintains its rest position as indicated in dot-dash lines when the support plate 16 is swivelled into the vertical loading or pressing position, so that the locking lever 116 also maintains the position shown in FIG. 1 and shown in dot-dash lines in FIG. 3. Only when the support plate 16 has reached this vertical loading and pressing position is the cylinder and piston unit 102 pressurized with pressure medium, in order to swivel the pressing device 26 into the conveying and pressing position shown in FIGS. 2 and 3, in which position it engages in the receiving opening 66 of the rear wall 38. By means of this swivelling movement of the pressing device 26, the unlocking bolts 112, 113 are moved away from the curved contact surface 121 of the locking lever 116. Accordingly, the locking levers 116 are swivelled, by the action of the pretensioned springs 118 supported between the support plate 16 and the locking levers, into the locking position shown in FIG. 3 in unbroken lines, in which they engage over the locking shafts 90, 91 and thus lock the support plate 16 in relation to the rear wall 38. As a result, a rigid composite structure is formed with the refuse collection container 14, the rear wall 38, the support plate 16 with integral pressing device 26 and the chassis 12, which is at all times capable of carrying off into the refuse collection container or the chassis the torques arising during the compaction of the refuse material in the refuse collection container.

FIG. 2 shows that the lifting and tipping device 22 is an integral part of the support plate 16. The lifting and tipping device 22 is known essentially from Austrian Patent No. 384 799. The support plate is equipped with a vertical guide 130 for a tipping shaft 134 provided with receiving arms 132. This tipping shaft 134 is rotatably held in lateral carriage slides 136, which are movable in cross-sectionally U-shaped rails 138 of the guide 130 of the support plate 16 and can be driven by means of a lift gear 139, which preferably comprises lifting cylinders. In addition to the lift gear 139, a swivel gear 140 for the tipping shaft 134 is provided, which has a swivel lever 141, which is connected in a rotationally fixed manner to the tipping shaft 134, preferably comprises two lateral arms, and supports at its free end a sliding block 142 in the form of a guide roller, with which it engages in a slot 144. The slot 144 comprises a section 145, which is parallel to the guide 130, and a section 146, which is transverse to the guide 130, so that when the carriage slide 136 undergoes a lifting movement the sliding block 142 is first guided in the slot section 145 which is parallel to the guide 130, before a swivel movement of the swivel lever 141 occurs by means of the sliding block 142 engaging in the slot section 146 (FIG. 3). A refuse bin 24, which has been accepted by the receiving arms 132, is thus first lifted from the ground in a pure lifting movement, in order to be subsequently emptied into the refuse collection vehicle 10 by means of an additional swivel movement, as indicated in FIG. 2 in dot-dash lines. As the distance of the end 148 of the slot section 146 from the guide plane of the tipping shaft 134 exceeds the length of the swivel lever 141, the swivel lever 141 can be swivelled downwards beyond the horizontal when the carriage slides 136 are moved within the U-rails 138. This guiding of the swivel arm affords a swivel angle for the receiving arms 132 greater than 90°. The shape of the slot 144 determines the kinematic properties of the swivelling process and can thus be extensively adapted to the respective requirements. The tipping shaft 134 travels through the U-rail 138 of the guide 130 in a long hole 150, the swivel arm 141 engaging on the end of the tipping shaft 134 which travels through the U-rail 138 and running in the space between the slot 144 and the neighbouring U-rail 138. Extensive covering of the slot 144 is thus ensured and its dirtying is effectively prevented. In the area of the U-rails 138 of the guide 130, self-cleaning takes place because the carriage slides 136 scrape off collected dirt if necessary.

What is claimed is:

1. Refuse collection vehicle, the chassis of which is provided at a rear portion with a support frame for refuse collection containers, said containers being interchangeable with other containers and being equipped with integral support feet, a pressing device mounted on and integral with a lifting and tipping device for receiving refuse bins and being pivotally arranged on the rear end portion of the chassis, characterized in that a lifting and lowering device (11) is mounted on the support frame (34), said refuse collection container (14) having a one-piece rear wall (38) mounted on a fixed (at 40) upper side of the associated container opening (37), and, at the lower side of the container opening (37) being lockable in the closed position by means of a fastening device (68) which is movable to the open position by means of a swivel device (41), the rear wall (38) in its closed position being curved into the inside of the refuse collection container (140 and is provided with a receiving opening (66) for receiving the pressing device (26) in a vertical position, the pressing device (26) and the lifting and tipping device (22) being pivotally mounted about a swivel shaft (18) on a support plate (16), by means of a plate mounted operating device (20) at said rear portion of the chassis (12) and being movable between a horizontal interchange position for the refuse collection container (14), in which position the upper side of the support plate (16) adopts the height of the support surface of the support frame (34), whereby when the lifting and lowering device is actuated and the vehicle is driven forward, the container is removed from the vehicle and a vertical loading and pressing position, in which the support plate (16) is lockable with the rear wall (38) in its closed position by means of a locking device (114), and the contents of said refuse bins can be lifted and tipped into said container by said lifting and tipping device.

2. Refuse collection vehicle according to claim 1, characterized in that on the support plate (16) a swivel device (41) is arranged, by means of which the pressing device (26) is movable between a rest position and a working position.

3. Refuse collection vehicle according to one of claims 1 or 2, characterized in that the locking device (114) for the support plate (16) is positively controlled dependent upon the swivelling movement of the pressing device (26).

4. Refuse collection vehicle according to one of claims 1 or 2, characterized in that, in the interchange position of the support plate (16), the pressing device (26), in its rest position and by means of unlocking bolts (112, 113), holds locking levers (116) in the unlocked position against the action of a pretensioned spring (118) and, in the loading position of the support plate (16), the pressing device (26), when swivelled into the receiving opening (66) of the rear wall (38), releases the locking levers (116), so that the support plate (16) can be connected, by means of the locking levers (116) locking on locking shafts (90, 91) of the rear wall (38) of the refuse collection container (14), to this rear wall.

5. Refuse collection vehicle according to one of claims 1 or 2, characterized in that the pressing device (26) comprises at least one worm conveyor (110, 111).

6. Refuse collection vehicle according to one of claims 1 or 2, characterized in that the pressing device (26) comprises a pressure ram (108), guided in a telescope-like manner.

7. Refuse collection vehicle according to claim 1, characterized in that the pivotable rear wall (38) of the refuse collection container (14) is, in its closed position, curved in towards the inside of the refuse collection container.

8. Refuse collection vehicle according to one of claims 1, 2, or 7, characterized in that the refuse collection container (14) is a standardized container.

9. Refuse collection vehicle according to one of claims 1, 2, or 7, characterized in that the refuse collection vehicle (10) is part of a motor vehicle.

10. Refuse collection vehicle according to claim 1, characterized in that the support frame (34) of the chassis (12) for the refuse collection container (14) is formed by an additional frame of the refuse collection vehicle frame and the front axle(s) and the rear axle(s) of the refuse collection vehicle (14) is (are) air-suspended.

11. Refuse collection vehicle according to claim 1, characterized in that the support frame (34) comprises a special pressure medium operated lifting frame.

* * * * *